United States Patent
Iwahashi et al.

(10) Patent No.: US 9,327,773 B1
(45) Date of Patent: May 3, 2016

(54) CAB AND WORK MACHINE

(71) Applicant: KOMATSU LTD., Tokyo (JP)

(72) Inventors: Norihiro Iwahashi, Kyotanabe (JP);
Akihide Namura, Neyagawa (JP);
Masashi Hoshino, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/416,104

(22) PCT Filed: Oct. 24, 2014

(86) PCT No.: PCT/JP2014/078330
§ 371 (c)(1),
(2) Date: Jan. 21, 2015

(87) PCT Pub. No.: WO2015/056814
PCT Pub. Date: Apr. 23, 2015

(51) Int. Cl.
*B62D 33/06* (2006.01)
(52) U.S. Cl.
CPC .................................. *B62D 33/0617* (2013.01)
(58) Field of Classification Search
CPC .... B62D 33/06; B60H 1/00357; B60H 1/378; B60N 2/005
USPC ................................................... 296/63, 24.3
See application file for complete search history.

(56) References Cited

U.S. PATENT DOCUMENTS

| 6,450,284 B1 | 9/2002 | Sakyo et al. |
| 2014/0232130 A1 | 8/2014 | Tanaka et al. |

FOREIGN PATENT DOCUMENTS

| CN | 1300334 A | 6/2001 |
| JP | H10/292433 A | 11/1998 |
| JP | 2000-170209 A | 6/2000 |
| JP | 2005-133495 A | 5/2005 |
| JP | 2014-136951 A | 7/2014 |

*Primary Examiner* — Dennis H Pedder
(74) *Attorney, Agent, or Firm* — Drinker Biddle & Reath LLP

(57) ABSTRACT

A base has a second bracket extending toward a back panel. A controller main body is arranged between the base and the back panel, and fixed to the second bracket. In a plan view, at least a part of the controller main body is arranged between the base and the floor portion so as to overlap with the base, and a bolt fixing the controller main body to the second bracket is arranged between a rear end of the base and the back panel.

7 Claims, 8 Drawing Sheets

SIDE OF BACK PANEL 12

CAB AND WORK MACHINE

TECHNICAL FIELD

The present invention relates to a cab and a work machine.

REARGROUND ART

A controller of a work vehicle is often arranged centrally behind a driver's seat in a driver's cab since an operation condition of the controller associated with a vehicle operation can be confirmed instantly. The controller is accommodated in an oblong case collectively with equipment such as an MPU (Micro Processing Unit) associated with a certain function. The controller has on its outer surface a connector for connection of a cable or the like for communication with other equipment.

Such an arrangement of a controller is disclosed in Japanese Patent Laying-Open No. 2014-136951. According to this publication, two controllers are arranged in a longitudinal direction at a panel portion behind a driver's seat.

CITATION LIST

Patent Document

PTD 1: Japanese Patent Laying-Open No. 2014-136951

SUMMARY OF INVENTION

Technical Problem

However, the number of controllers has been increased because of advancement in functions of a work vehicle (for example, information-oriented construction, surrounding monitoring function, and the like) in recent years. Therefore, there is a problem that attaching and arranging of controllers will be difficult in view of securing a space.

The present invention was made to solve the problem described above, and its object is to provide a cab and a work machine to facilitate attaching and arranging controllers even when the number of controllers is increased.

Solution to Problem

A cab of the present invention comprises a floor portion, a base, a driver's seat, a back panel, and a controller main body. The base is arranged on the floor portion. The driver's seat is arranged on the base. The back panel is arranged behind the driver's seat. The base has a bracket extending toward the back panel. The controller main body is arranged between the base and the back panel and fixed to the bracket. In a plan view, at least a part of the controller main body is located between the base and the floor portion so as to overlap with the base, and a fixing part fixing the controller main body to the bracket is arranged between a rear end of the base and the back panel.

According to the cab of the present invention, at least a part of the controller main body is arranged so as to overlap with the base in a plan view. Therefore, the main body can be arranged on a front side of the cab, and a large space can be secured between the controller main body and the back panel. Accordingly, a cable can be readily arranged in the space.

Moreover, the fixing part fixing the controller main body to the bracket is arranged at a position between a rear end of the base and the back panel so as not to overlap with the base. Therefore, the controller main body can be fixed to the bracket from above.

According to the configuration described above, the controller main body can be arranged in the space between the driver's seat and the back panel, and an operation of attaching the controller main body can be readily performed even in a narrow space between the driver's seat and the back panel.

In the cab described above, a cover is further provided which covers an upper part of a portion of the controller main body located between a rear end of the base and the back panel in a plan view.

Accordingly, adhesion of water or dust to the controller main body can be suppressed by the cover, so that the controller main body can be protected.

In the cab described above, the cover constitutes at least a part of a duct connecting a first ventilating hole provided at the base and a second ventilating hole provided at the back panel.

Accordingly, a protective member for the controller main body and the duct connecting the first ventilating hole and the second ventilating hole can be formed with an integrated cover. Moreover, by attaching the cover, the protective member protecting the controller main body and the duct can be made at the same time, so that assembling can be readily performed.

In the cab described above, the controller main body has a connector, and the connector is arranged at a face of the controller main body on a side of the back panel.

According to the cab described above, a large space can be secured between the controller main body and the back panel. Therefore, even when a connector is provided at the face of the controller main body on the side of the back panel, a cable can be readily connected to the connector.

In the cab described above, the base has a vertical plate extending from a side of the driver's seat to a side of the floor portion. The bracket has a vertical plate part extending along the vertical plate and attached to the vertical plate, and a horizontal plate part extending from an upper end of the vertical plate part toward the back panel.

By attaching the controller main body on the horizontal plate part, the controller main body can be arranged at a height apart from the floor portion. Accordingly, since a height of the controller main body can be secured, the controller main body is prevented from being soaked in water when the floor portion is washed with water. Moreover, when the controller main body is fixed to the bracket, the controller main body can be held in the state of being placed on the horizontal plate part. Therefore, an operation of fixing the controller main body to the bracket can be readily performed.

In the cab described above, a cable is further provided which is connected to the controller main body and transmits a video signal acquired from a camera. The cable penetrates through the floor portion and extends from inside to outside of the cab.

Accordingly, a signal of an image captured outside of the cab can be processed by the controller main body arranged inside of the cab.

A work machine of the present invention has any one of the cabs described above.

According to the work machine of the present invention, attaching and arranging of the controller can be readily performed even when the number of controllers is increased.

Advantageous Effects of Invention

As described above, according to the present invention, a cab and a work machine can be achieved which facilitates attaching and arranging of a controller even when the number of controllers is increased.

DESCRIPTION OF EMBODIMENT

In the following, an embodiment of the present invention will be described with reference to the drawings.

Firstly, a configuration of a work machine according to one embodiment of the present invention will be described. In the following, a hydraulic excavator as one example of a work machine to which the idea of the present invention is applicable and a cab used for the hydraulic excavator will be described with reference to FIGS. 1 and 2. It should be noted that the present invention is applicable to a hydraulic excavator and also to work machines such as a crawler dozer, a wheel loader, and the like having a cab.

Figure 1:
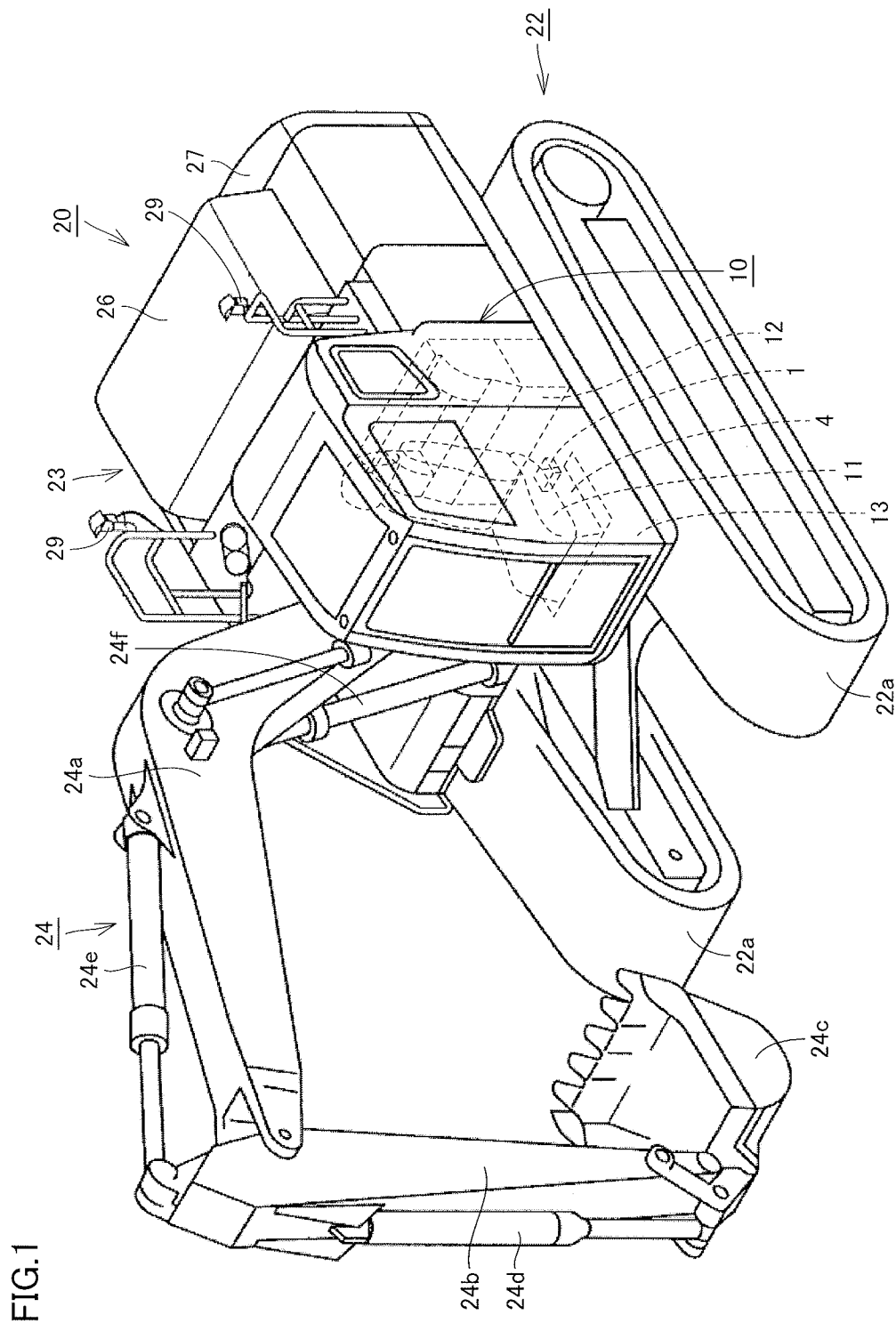
FIG. 1 is a perspective view schematically representing a configuration of a hydraulic excavator according to one embodiment of the present invention.
Figure 2:
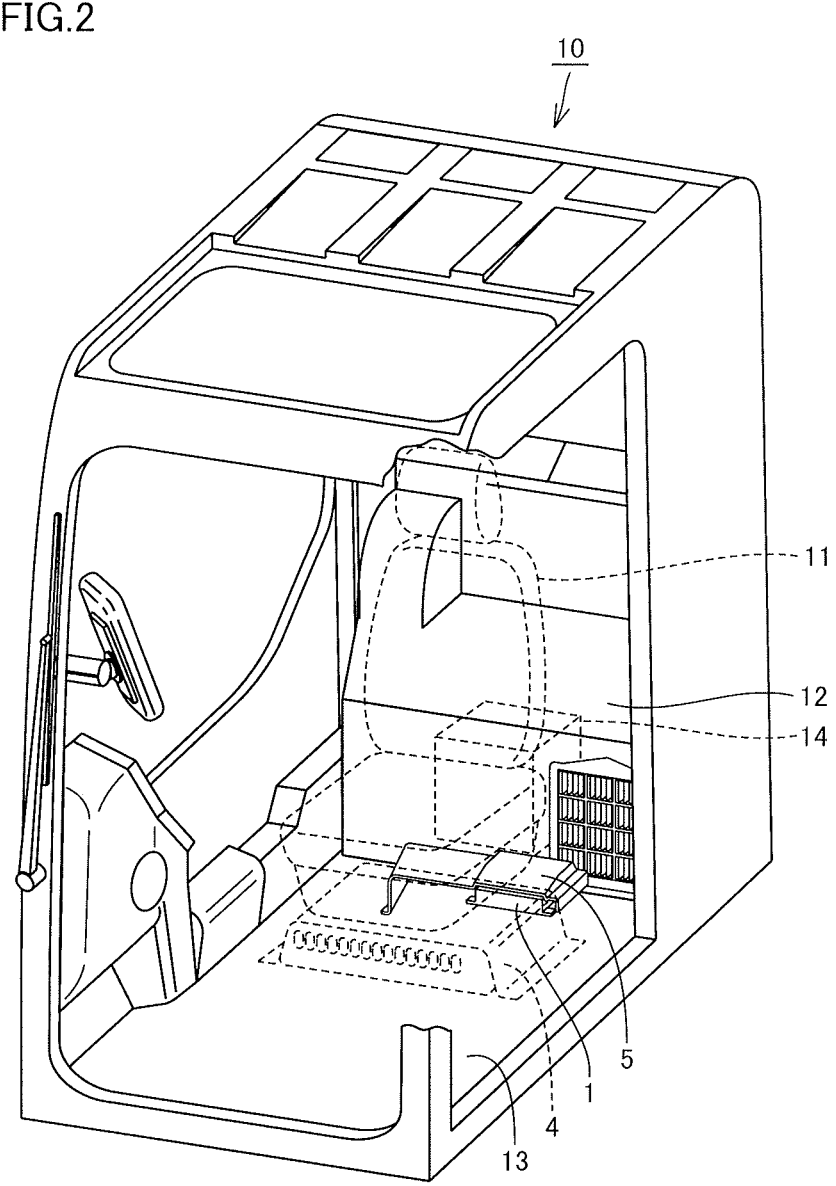
FIG. 2 is a partially enlarged view representing a cab of the hydraulic excavator of FIG. 1.

FIG. 1 is a perspective view schematically representing a configuration of the hydraulic excavator according to one embodiment of the present invention. FIG. 2 is a partially enlarged perspective view representing a cab of the hydraulic excavator of FIG. 1.

As shown in FIG. 1, a hydraulic excavator 20 mainly has a base carrier 22, an upper revolving unit 23, a work implement 24, and a controller main body 1.

Base carrier 22 is configured to be self-propelled with rotation of a pair of left and right crawler belts 22a. Upper revolving unit 23 is revolvably mounted on base carrier 22. Work implement 24 is axially supported on a front side of upper revolving unit 23 in an undulating manner. This work implement 24 has a boom 24a, a dipper stick 24b, a bucket 24c, hydraulic cylinders 24d, 24e, 24f, and the like.

Base carrier 22 and upper revolving unit 23 described above mainly constitute a work vehicle main body. Upper revolving unit 23 has a cab 10 on a front left side of the vehicle main body, and has an engine compartment 26 accommodating an engine and a counter weight 27 on a rear side of the vehicle main body. An antenna 29 is provided on an upper face of upper revolving unit 23.

As shown in FIG. 2, a cab 10 has an internal space. In the internal space of cab 10, a driver's seat 11 to be seated by an operator is arranged. Driver's seat 11 is arranged on a base 4, and base 4 is arranged on a floor portion 13 of cab 10. A back panel 12 is arranged behind driver's seat 11. Behind back panel 12, an air conditioning unit 14 is arranged.

In the internal space of cab 10 and between driver's seat 11 and back panel 12, controller main body 1 is arranged. This controller main body 1 is fixed to the base. An upper part of controller main body 1 is covered with a cover 5.

In the present embodiment, the front/rear and left/right sides of the vehicle are defined based on an operator to be seated on operator's seat 11 of cab 10 as a reference. The forward and rearward directions represent the forward and rearward directions of an operator seated on driver's seat 11. The leftward and rightward directions represent the leftward and rightward directions of an operator seated on driver's seat 11. The upward and downward directions represent the upward and downward directions of an operator seated on driver's seat 11. The direction confronting an operator seated on driver's seat 11 is the frontward direction, and the direction opposite to the frontward direction is the rearward direction. The right side and left side in the sideward direction in the state where an operator seated on driver's seat 11 confronts the front are the rightward direction and leftward direction, respectively. The side on feet of an operator seated on driver's seat 11 is the lower side and the side on a head is the upper side.

Next, a configuration of each member used for attaching the controller main body according to one embodiment of the present invention will be described with reference to FIG. 3.

Figure 3:
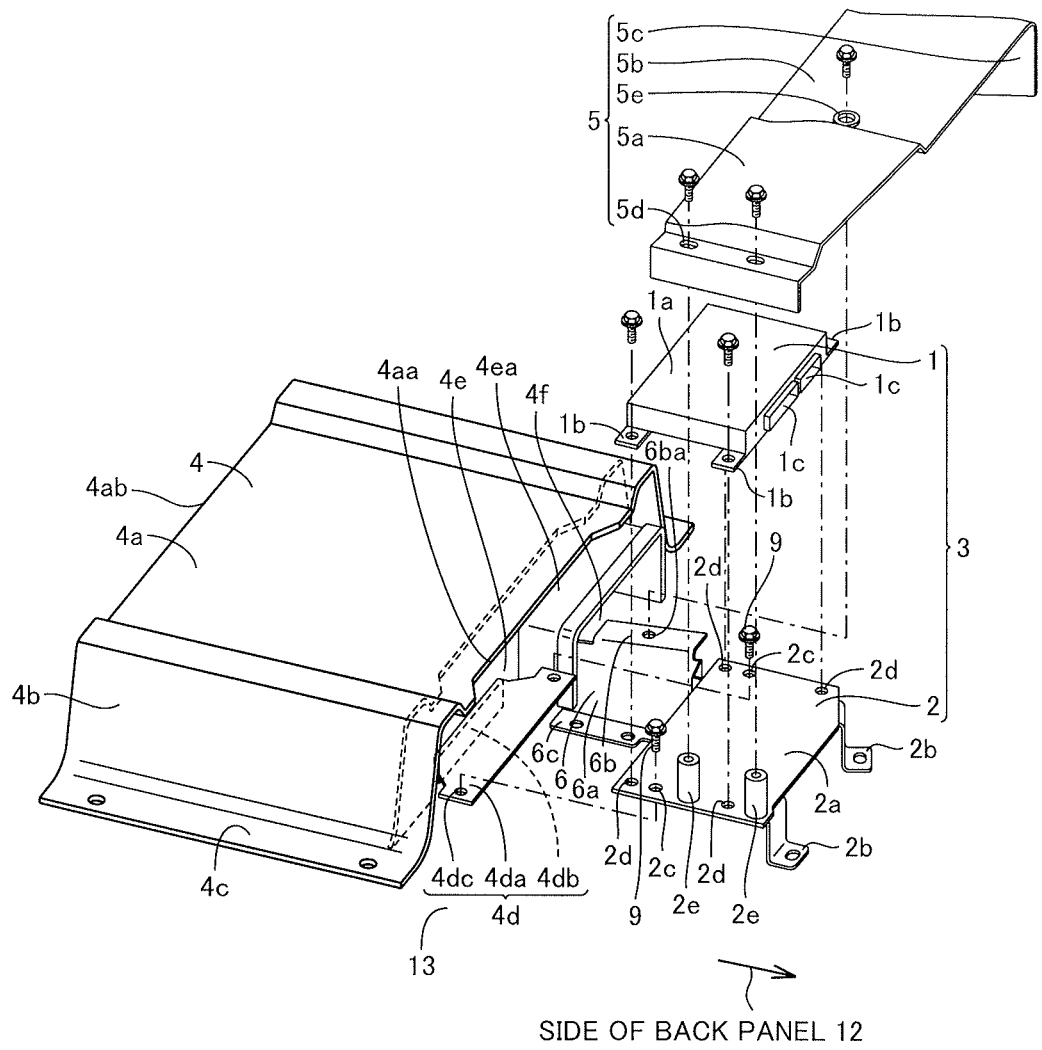
FIG. 3 is an exploded perspective view representing a configuration in which a controller main body is assembled according to one embodiment of the present invention.

FIG. 3 is an exploded perspective view representing a configuration in which the controller main body according to one embodiment of the present invention is assembled. As shown in FIG. 3, an assembly 3 of controller main body 1 and first bracket 2 is attached to base 4, and an upper part of controller main body 1 is covered with cover 5.

Controller main body 1 has a main body part 1a and, for example, four fixing parts 1b. Main body part 1a has a processing device such as an MPU inside thereof. For example, two cable connectors 1c are provided on a face of main body part 1a facing back panel 12 (FIG. 2).

Each of four fixing parts 1b is connected to main body part 1a and projects outward from main body part 1a. Two fixing parts 1b project from one side of main body part 1a, and remaining two fixing parts 1b project from a side opposite to the one side of the main body part described above. The one side and its opposite side from which four fixing parts 1b project are faces different from the face at which cable connectors 1c are provided. Each of four fixing parts 1b is provided with a through hole. The number of fixing parts 1b is not limited to four, and it is all necessary to be one or more.

First bracket 2 is a member for fixing controller main body 1 to base 4 and floor portion 13. This first bracket 2 has a plate part 2a, two leg parts 2b, and two projecting parts 2e. Plate part 2a has through holes 2c, 2d.

For example, both of two leg parts 2b are connected to plate part 2a, and extend from plate part 2a toward floor portion 13 (downward) in the same direction. For example, both of two projecting parts 2e are connected to plate part 2a and extend upward from plate part 2a in the same direction. The direction in which projecting parts 2e extend from plate part 2a is opposite to the direction in which leg parts 2b extend from plate part 2a. Female thread parts are formed on tips of projecting parts 2e. The number of each of leg parts 2b and projecting parts 2e is not limited to two, and is all necessary to be one or more.

Base 4 is a member for securing a height of driver's seat 11 (FIGS. 1 and 2). Base 4 is also required to attach a sliding rail (not illustrated) for sliding driver's seat 11 in the frontward and rearward directions. The sliding rail has a configuration in which a rail positioning stopper projects downward from an installation face. Therefore, the sliding rail cannot be directly installed on floor portion 13, and base 4 is required for installation of the sliding rail. Moreover, by providing base 4, air transferred from air conditioning unit 14 (FIG. 2) can be guided to a space between base 4 and floor portion 13 and sent out from a periphery of operator's feet.

Base 4 mainly has a top face part 4a, side face parts 4b, flange parts 4c, a second bracket 4d, and a vertical plate 4e. Top face part 4a is a portion on which driver's seat 11 is placed. Upper ends of side face parts 4b are connected to ends of top face part 4a, and lower ends of side face parts 4b are connected to flange parts 4c. Flange parts 4c project sideward from side face parts 4b. Top face part 4a, side face parts 4b, and flange parts 4c are integrally formed from one sheet of a plate member.

A vertical plate 4e is provided to secure a strength of base 4. Moreover, vertical plate 4e is provided so as to close a rear side of base 4. Accordingly, air transferred to a space between base 4 and floor portion 13 by air conditioning unit 14 is sent out by vertical plate 4e not from a rear side of base 4 but from a front side of base 4.

Vertical plate 4e is connected to top face part 4a and side face parts 4b by welding, for example. This vertical plate 4e extends from the side of top face part 4a (driver's seat) to the side of floor portion 13. Vertical plate 4e is attached to top face part 4a at a position apart a predetermined distance from, among two sides 4aa, 4ab of top face part 4a, one side 4aa to the other side 4ab. Each of two sides 4aa, 4ab is a side to which no side face part 4b is connected among four sides of top face part 4a. One side 4aa corresponds to a rear end of base 4, and the other side 4ab corresponds to a front end of base 4.

A through hole (first ventilating hole) 4f is formed at vertical plate 4e. This through hole 4f is a portion serving as a ventilating hole for allowing air transferred from air conditioning unit 14 (FIG. 2) to the space between base 4 and floor portion 13 to pass therethrough. Vertical plate 4e has a surrounding part 4ea. Surrounding part 4ea surrounds at least three sides of through hole 4f (upper part and side parts) and extends toward the side of the back panel. Surrounding part 4ea has an inverse U-shape when surrounding part 4ea is viewed from the rear side toward the front side (in a rear view).

Second bracket 4d is a portion for fixing assembly 3 to base 4. Second bracket 4d has a horizontal plate part 4da and a vertical plate part 4db, and has an L-shape in a side view. Horizontal plate part 4da and vertical plate part 4db are integrally formed from one sheet of a plate member. Vertical plate part 4db extends along vertical plate 4e, and is attached to vertical plate 4e by welding, for example. Horizontal plate part 4da is connected to an upper end of vertical plate part 4db, and extends toward the side of back panel 12.

This horizontal plate part 4da has, when viewed from a direction perpendicular to floor portion 13 (in a plan view), a portion overlapping with top face part 4a, and a portion projecting from a side 4aa of top face part 4a (rear end of base 4) toward the side of back panel 12. Through holes 4dc are formed at portions protruding from top face part 4a of horizontal plate part 4da (a portion between rear end 4aa of base 4 and back panel 12 in a plan view).

A partition member 6 is attached to surrounding part 4ea described above. Partition member 6 is a member for partitioning a region in which controller main body 1 is arranged and a region for allowing air transferred from air conditioning unit 14 to pass therethrough. Partition member 6 extends from surrounding part 4ea to the side of back panel 12 and is arranged between through hole 4f of vertical plate 4e and second bracket 4d.

Partition member 6 has a partition part 6a, an upper end bent part 6b, and a lower end bent part 6c. Partition part 6a is located between the region in which controller main body 1 is arranged and the region for allowing air transferred from air conditioning unit 14 to pass therethrough. Upper end bent part 6b is bent at the upper end of partition part 6a toward the region for allowing air transferred from air conditioning unit 14 to pass therethrough. A through hole 6ba is formed at this upper end bent part 6a. Lower end bent part 6c is bent at the lower end of partition part 6a toward the region in which controller main body 1 is arranged.

Cover 5 mainly has a protective part 5a, a duct top face part 5b, and a duct side face part 5c. Protective part 5a is a portion for protecting controller main body 1. Protective part 5a and duct top face part 5b constitute a top face part of cover 5. A step may be provided between protective part 5a and duct top face part 5b.

Duct side face part 5c is a portion bent downward from an end of duct top face part 5b. Duct top face part 5b and duct side face part 5c constitute a part of a duct connecting through hole 4f provided at base 4 and ventilating hole 12a (FIG. 6) provided on the side of the back panel. This cover 5 is provided with through holes 5d, 5e.

Next, attaching controller main body 1, cover 5, and the like according to one embodiment of the present invention will be described with reference to FIGS. 3 and 4.

Figure 4:
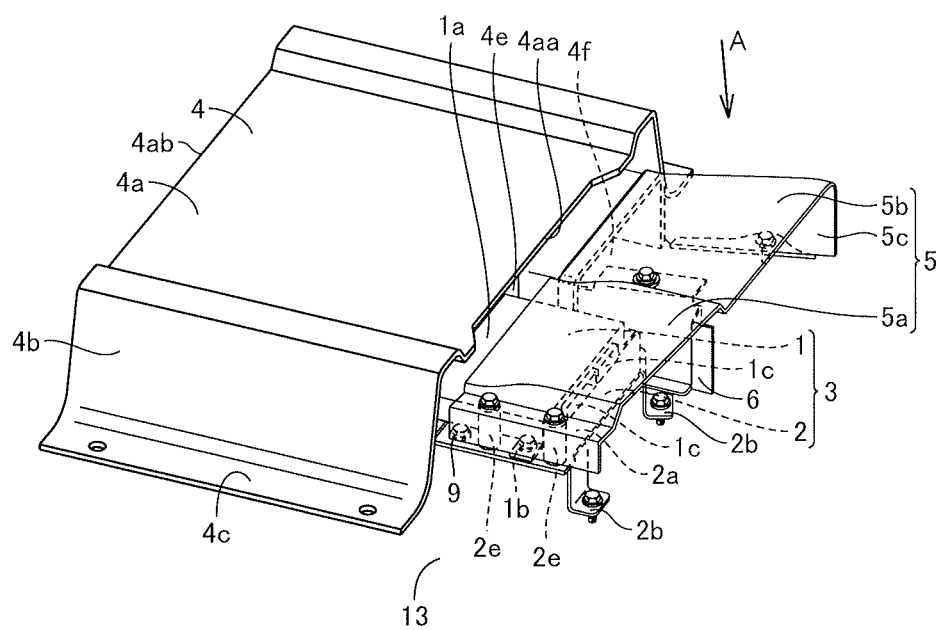
FIG. 4 is an assembled perspective view representing a configuration in which the controller main body of FIG. 3 is assembled.

FIG. 4 is an assembled perspective view representing a configuration in which the controller man body of FIG. 3 is assembled. As shown in FIGS. 3 and 4, fastening members such as bolts are inserted to both of through holes of projecting parts 1b and through holes 2d of plate parts 2a. These bolts and nuts (not illustrated) fasten controller main body 1 and first bracket 2, so that controller main body 1 is fixed to first bracket 2. Assembly 3 is constituted of controller main body 1 and first bracket 2.

Fastening members such as bolts 9 are inserted to both of through holes 2c of plate part 2a and through holes 4dc of second bracket 4d in this assembly 3. Bolts 9 and nuts (not illustrated) fasten plate part 2a and second bracket 4d, so that assembly 3 is fixed to second bracket 4d of base 4. Bolts 9 (fixing parts) are arranged at positions between rear end 4aa of base 4 and back panel 12 and not overlapping with base 4 in a plan view. In the state where assembly 3 is attached to second bracket 4d, plate part 2a is mounted to horizontal plate part 4da of second bracket 4d.

Cover 5 is attached to first bracket 2 by inserting fastening members such as bolts to through holes 5d of cover 5 and screwing them to female thread parts of projecting parts 2e. Moreover, cover 5 is fixed to partition member 6 by inserting a fastening member such as a bolt to both of through hole 5e of cover 5 and through hole 6ba of partition member 6 and fastening cover 5 and partition member 6 with the bolt and nut (not illustrated).

First bracket 2 is fixed to floor portion 13 by fastening leg parts 2b to floor portion 13 with bolts. Base 4 is fixed to floor portion 13 by fastening flange parts 4c to floor portion 13 with bolts. Partition member 6 is fixed to floor portion 13 by fastening lower end bent part 6b to floor portion 13 with bolts. Cover 5 is also fixed to floor portion 13 by fastening with bolts.

Next, a state of attaching controller main body 1, cover 5, and the like in one embodiment of the present invention will be described with reference to FIGS. 5 to 7.

Figure 5:
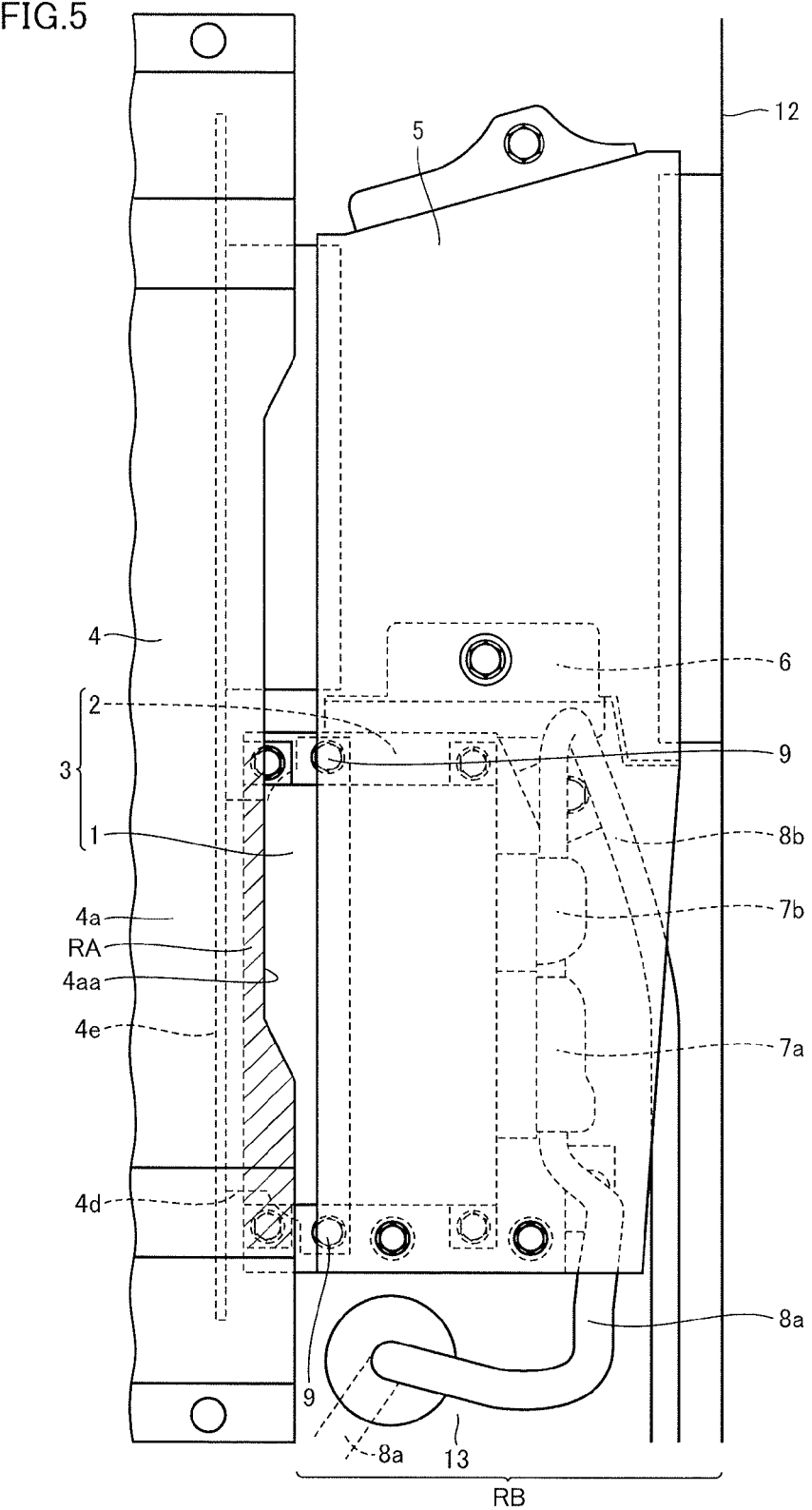
FIG. 5 is a plan view representing a part of the configuration in which the controller main body of FIG. 4 is assembled, viewed from a direction of an arrow A of FIG. 4 (in a direction perpendicular to the floor surface).

FIG. 5 is a plan view representing a part of the configuration in which the controller main body of FIG. 4 is assembled, viewed from the direction of an arrow A of FIG. 4 (in a direction perpendicular to the floor face). FIG. 6 is a perspective view representing a part of the configuration in which the controller main body of FIG. 4 is assembled. FIG. 7 is a schematic cross-sectional view taken along the line of FIG. 6.

As shown in FIG. 5, in the state where controller main body 1 is attached to base 4, at least a part of controller main body 1 (a hatched region RA in FIG. 5) overlaps with base 4 in a plan view. The portion of controller main body 1 overlapping with base 4 is located in the region sandwiched between top face part 4a of base 4 and floor portion 13.

In a plan view, a portion of controller main body 1 not overlapping with base 4 (the portion of controller main body 1 other than hatched region RA) is located between rear end 4aa of base 4 and back panel 12.

In a plan view, bolts (fixing part) 9 for fixing assembly 3 (controller main body 1) to second bracket 4d are arranged at positions not overlapping with base 4, and located between rear end 4aa of base 4 and back panel 12.

A terminal 7a of a cable 8a and a terminal 7h of a cable 8b are connected respectively to two connectors 1c (FIGS. 3 and 4) arranged at a face of controller main body 1 on the side of back panel 12.

In a plan view, cover 5 covers an upper part of a portion of controller main body 1 located between rear end 4aa of base 4 and back panel 12 (a portion of controller main body 1 not overlapping with base 4). In a plan view, this cover 5 covers an upper part of terminal 7a of cable 8a and terminal 7b of cable 8b, and also covers an upper part of a portion of each cable 8a and cable 8b.

Figure 6:
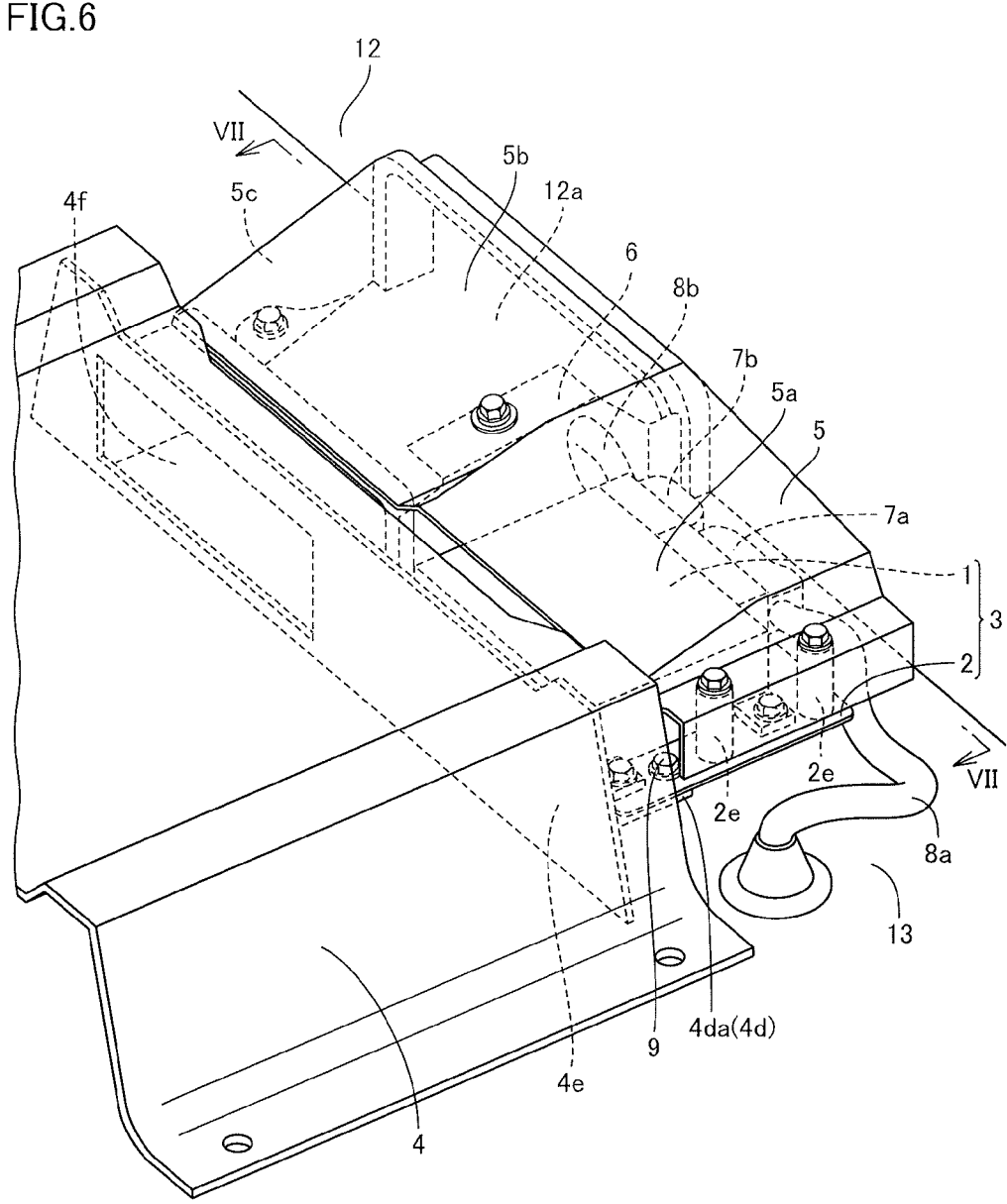
FIG. 6 is a perspective view representing a part of the configuration in which the controller main body of FIG. 4 is assembled.

As shown in FIG. 6, cover 5 constitutes at least a part of the duct connecting through hole (first ventilating hole) 4f provided at base 4 and a ventilating hole (second ventilating hole) 12a provided at back panel 12. As shown in FIGS. 6 and 7, a top face part of the duct connecting through hole (first ventilating hole) 4f and ventilating hole (second ventilating hole) 12a is constituted of duct top face part 5b of cover 5. One side face part of the duct is constituted of duct side face part 5c. The other side face part of the duct is constituted of partition member 6. The bottom face part of the duct is constituted of floor portion 13. Ventilating hole 12a provided at back panel 12 is a portion for allowing air transferred from air conditioning unit 14 (FIG. 2) to be sent out.

Figure 7:
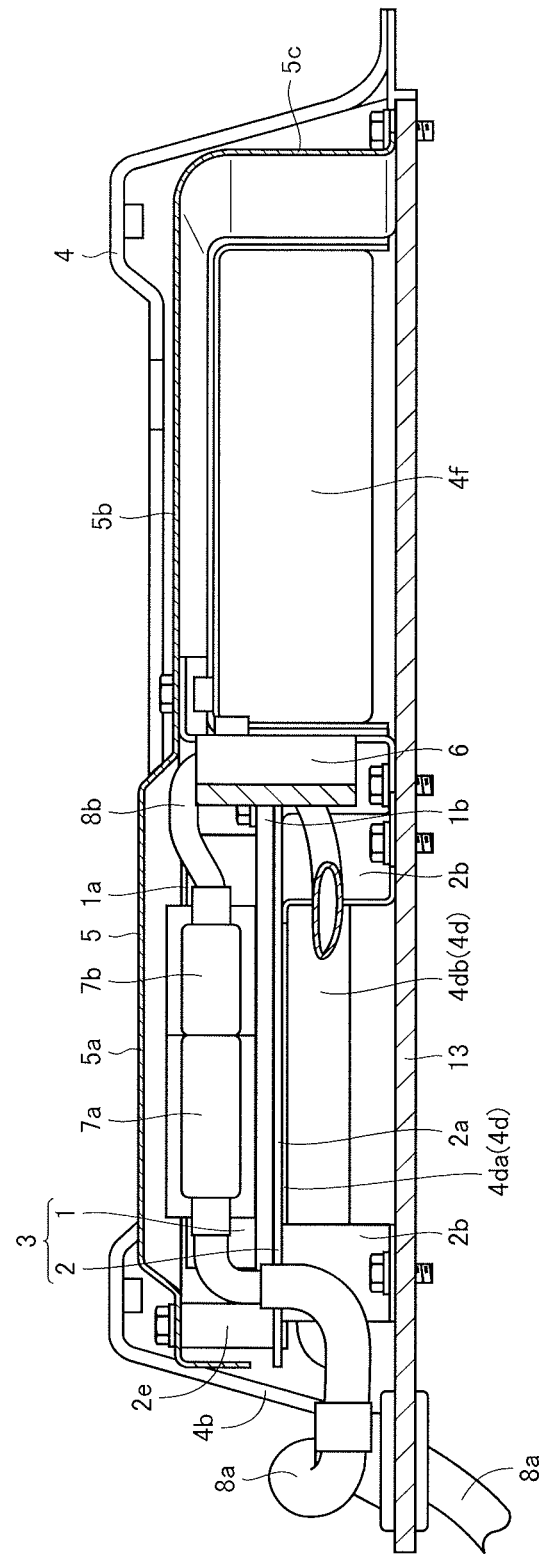
FIG. 7 is a schematic cross-sectional view taken along the VII-VII line of FIG. 6.

As shown in FIG. 7, cable 8a connected to controller main body 1 penetrates through floor portion 13 and extends from inside to outside of cab 10. This cable 8a is a cable for transmitting a video signal acquired from a camera, for example.

Figure 8:
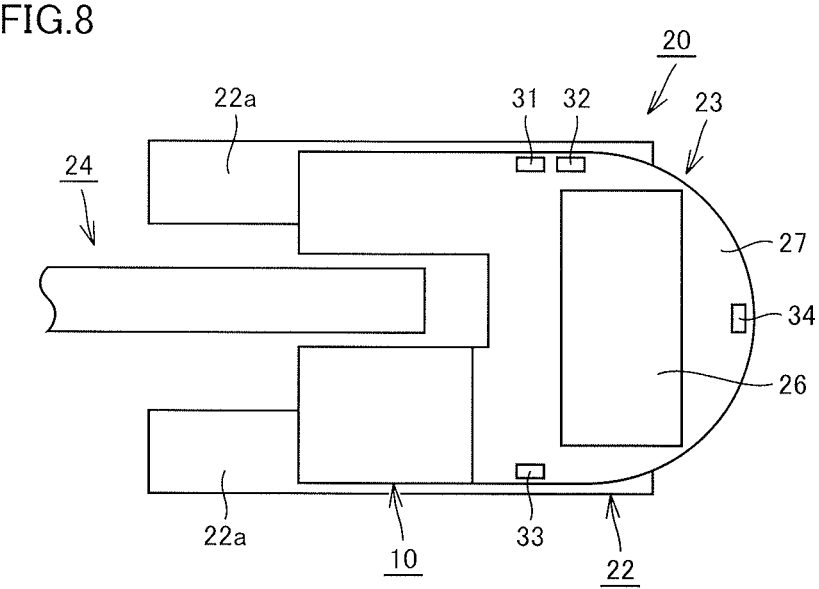
FIG. 8 is a plan view of the hydraulic excavator representing positions of cameras attached to the hydraulic excavator.

As shown in FIG. 8, for example, two cameras 31, 32 are arranged on a right side part of hydraulic excavator 20, and one camera 33 is arranged on a left side part, and one camera 34 is attached to counter weight 27 on a rear side. Signals of images captured by these cameras 31 to 34 can be sent to controller main body 1 through cable 8a. In controller main body 1, video signals of these cameras 31 to 34 are processed, so that an around-view of work machine 20 can be displayed on a monitor in cab 10.

Moreover, as shown in FIG. 5, by allowing cable 8a to penetrate through floor portion 13 in a region RB between base 4 and back panel 12 in a plan view, a distance of extending cable 8a to controller main body 1 in cab 10 can be shortened.

Next, effects of the present embodiment will be described.

According to the present embodiment, as shown in FIG. 5, at least a part of controller main body 1 (hatched region RA) is arranged so as to overlap with base 4 in a plan view. Therefore, as compared to the case where controller main body 1 does not overlap with base 4, controller main body 1 can be arranged more on a front side of cab 10. Accordingly, a large space can be secured between controller main body 1 and back panel 12, so that cables 8a, 8b and cable terminals 7a, 7b can be readily arranged in the space.

Moreover, bolts 9 fixing controller main body 1 to second bracket 4d are provided at positions between rear end 4aa of base 4 and back panel 12 and not overlapping with base 4. Therefore, bolts 9 can be readily fastened from above, so that controller main body 1 can be readily fixed to second bracket 4d.

According to the configuration described above, controller main body 1 can be arranged in the space between driver's seat 11 and back panel 12, and an operation of attaching controller main body 1 in the narrow space between driver's seat 11 and back panel 12 can also be readily performed.

Moreover, as shown in FIG. 5, an upper part of the portion of controller main body 1 located between rear end 4aa of base 4 and back panel 12 in a plan view (the portion of controller main body 1 not overlapping with base 4) is covered with cover 5. Accordingly, cover 5 can suppress adhesion of water or dust on controller main body 1, so that controller main body 1 can be protected.

Moreover, as shown in FIG. 6, cover 5 constitutes at least a part of the duct connecting through hole 4f provided at base 4 and ventilating hole 12a provided at back panel 12. Accordingly, the protective member of controller main body 1 and the duct connecting through hole 4f and ventilating hole 12a can be formed with integrated cover 5. Moreover, by attaching cover 5, the protective member protecting controller main body 1 and the duct can be attached at the same time, so that assembling can be readily performed.

Moreover, as shown in FIG. 3, controller main body 1 has connectors 1c, and connectors 1c are arranged a face of controller main body 1 on the side of back panel 12. According to cab 10 described above, a large space can be secured between controller main body 1 and back panel 12. Therefore, even when connectors 1c are provided at a face of the controller main body on the side of back panel 12, cables 8a, 8b (FIGS. 5 to 7) can be connected to connectors 1c.

Moreover, as shown in FIG. 3, base 4 includes vertical plate 4e. Second bracket 4d has vertical plate part 4db extending along vertical plate 4e and attached to vertical plate 4e, and horizontal plate part 4da extending from an upper end of vertical plate part 4db toward back panel 12. By attaching controller main body 1 on this horizontal plate part 4da, controller main body 1 can be arranged at a height apart from floor portion 13. Accordingly, since a height of controller main body 1 can be secured, controller main body 1 is prevented from being soaked in water when floor portion 13 is washed with water. Moreover, when controller main body 1 is fixed to second bracket 4c1, controller main body 1 can be held in the state of being placed on horizontal plate part 4da. Therefore, an operation of fixing controller main body 1 to second bracket 4d can be readily performed.

Moreover, as shown in FIG. 7, cable 8a connected to controller main body 1 and transmitting video signals acquired from cameras 31 to 34 (FIG. 8) penetrates through floor portion 13 and extends from inside to outside of cab 10. Accordingly, signals of images captured outside of cab 10 can be processed by controller main body 1 arranged inside of cab 10.

In the embodiment described above, the case is described in which the fixing parts for fixing assembly 3 having controller main body 1 to second bracket 4d are bolts and nuts. However, the fixing parts are not limited to those. The fixing parts may be the one configured to fix by means of other members or methods such as pins and welding.

It should be understood that the embodiment disclosed herein is illustrative and non-restrictive in every respect. The scope of the present invention is defined by the terms of claims, rather than the description of the embodiments set forth above, and is intended to include any modifications within the scope and meaning equivalent to the terms of the claims.

REFERENCE SIGNS LIST 1 controller main body; 1a main body part; 1b fixing part; 1b projecting part; 1c cable connector; 2 first bracket; 2a plate part; 2b leg part; 2e projecting part; 2c, 2d, 4dc, 4f, 5d, 5e, 6ba through hole; 3 assembly; 4 base; 4a top face part; 4b side face part; 4c flange part; 4d second bracket; 4da horizontal plate part; 4db vertical plate part; 4e vertical plate; 4ea surrounding part; 5 cover; 5a protective part; 5b duct top face part; 5c duct side face part; 6 partition member; 6a partition part; 6b upper end bent part; 6c lower end bent part; 7a, 7b cable terminal; 8a, 8b cable; 9 bolt; 10 cab; 11 driver's seat; 12 back panel; 12a ventilating hole; 13 floor portion; 14 air conditioning unit; 20 work machine (hydraulic excavator); 22 base carrier; 22a crawler belt; 23 upper revolving unit; 24 work implement; 24a boom; 24b dipper stick; 24c bucket; 24d hydraulic cylinder; 26 engine compartment; 27 counter weight; 29 antenna; 31 to 34 camera.

The invention claimed is:

1. A cab comprising:
a floor portion;
a base arranged on said floor portion;
a driver's seat arranged on said base;
a back panel arranged behind said driver's seat, said base having a bracket extending toward said back panel; and
a controller main body arranged between said base and said back panel and fixed to said bracket, in a plan view, at least a part of said controller main body being arranged between said base and said floor portion so as to overlap with said base, and a fixing part fixing said controller main body to said bracket being arranged between a rear end of said base and said back panel.

2. The cab according to claim 1, further comprising:
a cover covering an upper part of a portion of said controller main body located between a rear end of said base and said back panel in a plan view.

3. The cab according to claim 2, wherein
said cover constitutes at least a part of a duct connecting a first ventilating hole provided at said base and a second ventilating hole provided at said back panel.

4. The cab according to claim 1, wherein
said controller main body has a connector, and said connector is arranged at a face of said controller main body on a side of said back panel.

5. The cab according to claim 1, wherein
said base has a vertical plate extending from a side of said driver's seat to a side of said floor portion, and
said bracket has a vertical plate part extending along said vertical plate and attached to said vertical plate and a horizontal plate part extending from an upper end of said vertical plate part toward said back panel.

6. The cab according to claim 1, further comprising:
a cable connected to said controller main body and transmitting a video signal acquired from a camera, wherein
said cable penetrates through said floor portion and extends from inside to outside of said cab.

7. A work machine comprising a cab according to claim 1.

* * * * *